United States Patent
Cruz et al.

(10) Patent No.: US 6,875,802 B2
(45) Date of Patent: Apr. 5, 2005

(54) PROCESSES FOR PREPARING NON-GELLING HIGH POLYMER COMPOSITIONS AND THERMOPLASTIC BLENDS THEREOF

(75) Inventors: Carlos Alfonso Cruz, Holland, PA (US); Eugene Patrick Dougherty, Langhorne, PA (US); Harry Richards Herman, III, Perkasie, PA (US); Robert Julian Smith, Harleysville, PA (US); Morris Christopher Wills, Philadelphia, PA (US); Robert Victor Slone, Quakertown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 104 days.

(21) Appl. No.: 10/082,393

(22) Filed: Feb. 25, 2002

(65) Prior Publication Data

US 2002/0161126 A1 Oct. 31, 2002

Related U.S. Application Data

(60) Provisional application No. 60/272,002, filed on Feb. 27, 2001.

(51) Int. Cl.$^7$ .............................. C08F 2/24; C08F 8/00; C08F 220/18; C08F 265/04
(52) U.S. Cl. ........................ 524/54; 524/458; 524/501; 524/832; 526/71; 526/230
(58) Field of Search .......................... 524/54, 458, 501, 524/832; 526/71, 230

(56) References Cited

U.S. PATENT DOCUMENTS

| | | |
|---|---|---|
| 3,062,765 A | 11/1962 | Sherman et al. |
| 3,833,686 A | 9/1974 | Grochowski et al. |
| 4,086,296 A | 4/1978 | Carty et al. |
| 4,107,114 A | 8/1978 | Nakayama et al. |
| 5,506,307 A | 4/1996 | Memon et al. |
| 6,031,047 A | 2/2000 | Brady et al. |
| 6,190,767 B1 * | 2/2001 | Ishikawa et al. ...... 428/355 AC |
| 6,242,531 B1 * | 6/2001 | Craun et al. ................. 524/833 |

FOREIGN PATENT DOCUMENTS

| | | | |
|---|---|---|---|
| EP | 0 313 849 B1 | 4/1991 | |
| EP | 0 697 423 B1 | 1/1999 | |
| FR | 2 328 505 | 10/1976 | |
| WO | WO 9707174 A1 * | 2/1997 | .......... C09J/133/06 |

* cited by examiner

*Primary Examiner*—Kelechi C. Egwim
(74) *Attorney, Agent, or Firm*—Marcella M. Bodner; Jeffrey H. Rosedale

(57) ABSTRACT

Disclosed are compositions and processes for preparing polymeric materials having polymerizable units derived from at least one $C_8$ to $C_{30}$ alkyl (meth)acrylate monomer, and at least one chain branching unit. The presence of the chain branching unit suprisingly results in the polymeric composition having non-gelled polymer chains. The polymeric compositions are useful as additives for improving the melt strength of thermoplastic resins.

11 Claims, No Drawings

US 6,875,802 B2

PROCESSES FOR PREPARING NON-GELLING HIGH POLYMER COMPOSITIONS AND THERMOPLASTIC BLENDS THEREOF

CROSS REFERENCE TO RELATED PATENT APPLICATION

This is a non-provisional application of prior pending U.S. provisional application Ser. No. 60/272,002 filed on Feb. 27, 2001.

BACKGROUND

The present invention relates to non-gelling high polymer compositions. The present invention also relates to polymer blend compositions which contain non-gelling, high molecular weight polymer compositions and thermoplastic polymer resins. The present invention further relates to processes for increasing the melt strength of thermoplastic polymer resins using non-gelling, high molecular weight polymer compositions. The present invention even further relates to processes for preparing non-gelling, high molecular weight polymer compositions and polymer blend compositions containing the same.

Thermoplastic polymer resins are used to prepare numerous articles of commerce. Similarly, there are many polymer melt processing methods used for fashioning articles from thermoplastic polymer resins.

While certain polymer melt processing methods require molten polymer resins that are fluid in nature and flow readily, other polymer melt processing methods require molten polymer resins that resist flow. Such molten polymer resins that resist flow are deemed to have a high melt strength.

While many thermoplastic resins have sufficient melt strength, others such as polyolefins (e.g., polypropylene and polyethylene) typically do not. Those thermoplastic resins which have relatively lower melt strengths tend to sag when the requisite heat and stress necessary to melt and mold them during certain processing procedures. Sagging of molten thermoplastic resins is especially a problem during molding processes which involve thick and heavy articles. These problems can result in the articles being formed having breaks, cracks and/or varying thicknesses. Accordingly, the plastic processing industry has continually sought to increase the melt strength of certain thermoplastic resins.

There have been several attempts to resolve this melt strength problem. One such attempt is disclosed in U.S. Pat. No. 5,506,307 ("Memon").

Memon discloses increasing the melt strength of a polyolefin by the addition of additives based on high molecular weight polymers. Specifically, Memon discloses that high molecular weight polymers and certain copolymers of $C_{10}$ to $C_{30}$ alkyl (meth)acrylates can be used to increase the melt strength of polyolefins. Memon also discloses that such additives can be a homopolymer of one or more $C_{10}$ to $C_{30}$ alkyl (meth)acrylate or a copolymer containing at least 70 weight percent of the one or more $C_{10}$ to $C_{30}$ ester of an alkyl (meth)acrylate with up to 30 weight percent of one or more of a $C_1$ to $C_9$ alkyl (meth)acrylate, the homopolymer or copolymer having a weight-average molecular weight of at least 670,000, more preferably at least 1,500,000.

Memon recognized that it is difficult to polymerize monomers such as the higher alkyl (meth)acrylates, which are almost completely insoluble in water, with conventional amounts of emulsifiers and those conventional initiators which are effective for lower alkyl alkyl (meth)acrylate monomers, such as ethyl acrylate or methyl methacrylte. Memon further recognized that problems commonly encountered during such emulsion polymerizations can include: poor conversion to polymer, puddling of monomer with resultant gum, phase separation of particles, and non-uniform copolymerization in the presence of monomers having higher water solubility. While Memon alleviated many of the aforementioned problems, the plastics industry continues to seek further improvements in this area.

It is known in the plastics' industry that high-alkyl ($C_8$ to $C_{30}$) (meth)acrylate polymers oftentimes contain gelled polymer chains. Under certain circumstances, this is undesirable. For example, when used as melt strength additives for thermoplastic polymer resins, the presence of gelled polymer chains not only reduces the additive's ability to effectively increase the resulting blend's melt strength, but also reduces the additive's ability to effectively disperse within the blend. Moreover, in addition to reducing its effectiveness as a melt strength enhancer, the poor dispersion of these additives in the resulting thermoplastic resin blend can also cause unattractive optical and surface imperfections in articles being formed.

In view of the above, the plastics' industry would greatly welcome a means for improving the melt strength of certain thremoplastic resins without encountering the problems associated with the formation of gelled polymer chains.

Accordingly, one object of the present invention is to provide a means for improving the melt strength of certain thermoplastic resins without encountering the problems associated with the formation of gelled polymer chains.

Another object of the present invention is to provide a high molecular weight, high-alkyl (meth)acrylate polymer composition which can be used to improve the melt strength of certain thermoplastic resins without encountering the problems associated with the formation of gelled polymer chains.

STATEMENT OF INVENTION

These and other objects, which will become readily apparent to those skilled in the art after reading this specification, have been accomplished by inventing a polymeric composition which comprises polymerizable units derived from at least one $C_8$ to $C_{30}$ alkyl (meth)acrylate monomer, and at least one chain branching unit, said chain branching unit present in an amount not greater than 0.10 weight percent based on total weight of the polymeric composition. The presence of the chain branching unit surprisingly results in the polymeric composition having non-gelled polymer chains and having a weight average molecular weight of at least 100,000 g/mol.

In one embodiment of the present invention, there is provided a polymeric composition having non-gelled polymer chains, comprising:

a) polymerizable units derived from at least one $C_8$ to $C_{30}$ alkyl (meth)acrylate monomer, and b) at least one chain branching unit, said chain branching unit present in an amount not greater than 0.10 weight percent based on total weight of the $C_8$ to $C_{30}$ alkyl (meth)acrylate monomer, wherein said polymeric composition has a weight average molecular weight of at least 100,000 g/mol.

In another embodiment of the present invention, there is provided a polymer blend composition, comprising at least the following:

a) at least one thermoplastic polymer resin, and b) at least one polymeric composition having non-gelled polymer chains, said polymeric composition comprising:
   i) polymerizable units derived from at least one $C_8$ to $C_{30}$ alkyl (meth)acrylate monomer, and
   ii) at least one chain branching unit, said chain branching unit present in an amount not greater than 0.10 weight percent based on total weight of the $C_8$ to $C_{30}$ alkyl (meth)acrylate monomer,
wherein said polymeric composition has a weight average molecular weight of at least 100,000 g/mol.

In yet another embodiment of the present invention, there is provided a process for preparing an aqueous dispersion of polymer particles comprising a polymeric composition having non-gelled polymer chains, said process comprising the steps of:
a) preparing an aqueous emulsion of hydrophobic monomer droplets, said droplets comprising:
   i) at least one $C_8$ to $C_{30}$ alkyl (meth)acrylate monomer,
   ii) at least one chain branching monomer, said chain branching monomer present in an amount not greater than 0.10 weight percent based on total weight of the $C_8$ to $C_{30}$ alkyl (meth)acrylate monomer, and
   iii) at least one emulsifier; and
b) polymerizing, by at least one technique selected from the group consisting of conventional emulsion polymerization, bulk polymerization and solution polymerization, said $C_8$ to $C_{30}$ alkyl (meth)acrylate monomer with said at least one chain branching monomer using at least one free radical initiator to form said aqueous dispersion of polymer particles comprising a polymeric composition having non-gelled polymer chains, wherein said polymeric composition has a weight average molecular weight of at least 100,000 g/mol.

DETAILED DESCRIPTION

The term "(meth)acrylate" as used herein refers to the combination of both acrylates and methacrylates.

The term "parts" as used herein is intended to mean "parts by weight". Unless otherwise stated, "total parts by weight" do not necessarily add to 100.

The term "phr" as used herein is intended to mean "parts per hundred parts resin" and is on a weight basis.

The term "weight percent" as used herein refers to "parts per hundred".

The term "alkyl" as used herein refers to linear, branched and cyclic saturated hydrocarbon chemical groups.

The term "$C_N$ alkyl", where N is a number, refers to saturated alkyl groups comprised of N carbon atoms.

The term "high-alkyl" as used herein refers to $C_N$ alkyl, where N is a number greater than or equal to 8.

The term "molecular weight" as used herein refers to peak average molecular weight as determined by gel permeation chromatography against narrow molecular weight polystyrene standards in tetrahydrofuran solvent at 25° C. using Polymer Laboratories data manipulation software.

All ranges disclosed herein are inclusive and combinable.

The invention disclosed herein pertains, in part, to the development of new high molecular weight polymeric compositions which not only provides increased melt strength in thermoplastic resins, but also does so with a minimum amount of gelled polymer chains. Those new polymeric composition comprise units derived from polymerizable units derived from at least one $C_8$ to $C_{30}$ alkyl (meth)acrylate monomer, and at least one chain branching unit.

The present invention provides polymeric compositions that are useful as melt strength additives for thermoplastic resins such as polyolefins. The present invention also provides a reliable, robust and economic processes for making these polymeric compositions.

The high-alkyl (meth)acrylate monomers include the CN alkyl (meth)acrlyate moners, wherein N is in the range of from 8 to 30. More typically, N is in the range of from 10 to 24, and even more typically N is in the range of from 12 to 18. Examples of monomers having N in the range of from 12 to 18 include, but are not limited to lauryl acrylate, lauryl methacrylate, dodecyl methacrylate and dodecyl acrylate, stearyl acrylate, stearyl methacrylate, cetyl acrylate, cetyl methacrylate. The N-alkyl methacrlyate monomers are typically preferred over the N-alkyl acrylate monomers.

While the polymeric compositions of the present invention typically contain homopolymer linear chains that are branched, the polymer chains may also contain copolymers having arrangements of monomer units in the form of at least one of the following types of copolymers: random, alternating, periodic, block, star-block, and branched.

While homopolymers and copolymers only require at least the aforementioned $C_8$ to $C_{30}$ alkyl (meth)acrylate and chain branching monomers, additional comonomers may also be copolymerized with them. These additional comonomers may be characterized as "hydrophobic" or "hydrophilic". Suitable hydrophobic comonomers include, but are not limited to, the $C_1$ to $C_7$ alkyl (meth)acrylate monomers, aromatic monomers such as styrene, acrylonitrile, and methacrylonitrile. Hydrophilic monomers include, but are not limited to, 3-sulfopropyl methacrylate potassium salt, acid-containing ehtylenically unsaturated monomers such as acrylic acid, methacrylic acid, and itaconic acid, epoxide-containing ethylenically unsaturated monomers such as glycidyl methacrylate, and hydroxy-alkyl (meth)acrylate monomers.

In certain embodiments of the present invention, functional groups are present in the polymer composition. The presence of functional groups are useful incertain embodiments where it is desirable to provide systems of reactive polymers. In these embodiments, the types of functional groups include epoxide (e.g. glycidyl methacrylate), acid (carboxylic acids like methacrylic acid or acrylic acid), and alcoholic (e.g. hydroxy-alkyl (meth)acrlyate) moeities.

The relative amounts of each monomer, based on the total weight of the $C_8$ to $C_{30}$ alkyl (meth)acrylate monomers are as follows: hydrophobic comonomers up to 60 weight percent, typically from 1 to 50 weight percent, and more typically from 5 to 30 weight percent; hydrophilic comonomers up to 10 weight percent, typically from 0.1 to 5 weight percent, and even more typically from 0.5 to 2.0 weight percent.

The polymer composition molecular weights and architecture (arborescence) are controlled to interact with the thermoplastic resin polymer chains for increasing the resin's melt strength.

The molecular weight of the polymeric compositions according to the present invention is typically at least 100,000 g/mol, more typically at least 200,000 g/mol, and even more typically at least 500,000 g/mol. While there is no upper limit to the molecular weight, a practical upper limit is when all of the polymer chains are crosslinked or gelled. In ensuring that non-gelled polymer chains are present, the molecular weight of the polymeric compositions will typically be less than 3,000,000 g/mol, more typically less than 2,000,000 g/mol, and even more typically less than 1,500,000 g/mol.

Incorporation of the chain branching monomers having two or more reactive sites (e.g., polyfunctional monomers) into the polymeric composition ensures that the desired molecular weight ranges are achieved while providing for non-gelled polymer chains. While it is desirable that each of the reactive sites are reacted to a polymer chain, it is within the purview of the present invention that some of the reactive sites may remain unreacted.

The use of polyfunctional monomers as the chain branching monomers is to provide an efficient method of "building up" the molecular weight of the $C_8$ to $C_{30}$ alkyl (meth) acrylate polymers by linking together and/or forming branches between two or more polymer molecules without forming insoluble crosslinked gelled polymer. Too much polyfunctional compound causes crosslinking, while too little does not provide the sufficient molecular weight. In certain embodiments of the present invention containing acid-containing monomers in the polymeric composition, the presence of ions may also create ion-acid induced crosslinking. In these embodiments, chain branching can also be controlled through such acid-ion linkages. Accordingly, an excess of acid-ion linkages will result in an excess crosslinking and formation of gelled polymer chains.

While the polymeric composition of the present invention contains non-gelled polymer chains, it is desirable to ensure that the amount of non-gelled polymer chains is as high as possible. The amount of non-gelled polymeric chains in the polymeric composition is typically at least 50 weight percent, more typically at least 75 weight percent, and even more typically at least 90 weight percent, these weight percentages being based on the total weight of the polymeric compostion. Likewise, the amount of gelled polymer chains is typically no more than 50 weight percent, more typically no more than 25 weight percent, and even more typically no more than 10 weight percent, these weight percentages being based on the total weight of the polymeric composition.

In certain embodiments of the present invention, various components are added to the polymer particle dispersions. Surfactants are typically added to impart shear stability to the dispersion of polymer particle. While any type of aqueous-compatible surfactant is suitable, typical surfactants include a sodium salt of a fatty alcohol ether sulfate. While any type of thermal stabilizers suitable for aqueous based polymeric materials are also known, typical thermal stabilizers include hindered phenols, polyphenols, phosphites, EDTA, epoxidized.

In several embodiments an external hard phase provided for spray-drying the polymeric compositions into a powder form. In this embodiment, the hard phase may be a hard polymer shell, a hard polymer particle, or one or more combinations of at least one hard polymer shell and hard polymer particles. Based on the total polymer composition of hard and soft phases, the amount of $C_8$ to $C_{30}$ alkyl (meth)acrylate monomers is typically in the range of from 50 to 70 weight percent, the amount of hydrophobic comonomers is typically in the range of from 25 to 49.5 weight percent, the amount of hydrophilic monomers is typically in the range of from 0.5 to 2 weight percent. The amount of chain branching units will be up to 0.10 weight percent based on the amount of $C_8$ to $C_{30}$ alkyl (meth) acrylate monomers.

While many types of hard particulate flow aids are known for preparing powders having improved powder flow properties, it is typical to use high Tg polymer particle dispersions. Suitable examples of high Tg polymer particle dispersions contain high molecular weight methacrylic/styreneic based polymers having a mean particle diameter of less than 100 nm. Polymeric flow aids may also consist of polmeric particles having a crystalline melt transition temperature above 100° C., including such types of polymers as polyolefins (e.g., polyethylene and polypropylene) and polyflourocarbon polymers (e.g., polytetraflouroethylene polychlorotrifolouroethylene). It is also typical to use mineral flow aids for improving powder flow properties. Suitable examples of mineral flow aids include those based on calcium carbonate and silica. The composition may further contain salts, such as calcium chloride, which results from isolating the polymer particles by coagulation, While the use of an external hard phase is useful for recovering the polymeric composition in a dried powder form, the external hard phase is not required for direct extrusion of the polymeric composition into a film or extrudate that can be subsequently chopped into pellets. The hard phase is also not required where it is desirable to prepare concentrate blends of the polymer composition with at least one other thermoplastic resin.

It will be appreciated that increasing the amount of flow aids typically increases the ability to recover the polymer particles as a free-flowing powder, higher amounts of flow aid also reduce the effectiveness of the polymeric composition as a melt strength additve for thermoplastic resins.

In various embodiments where it is desrible to isolate the polymeric compositions of the present invention by direct extrusion, the following amounts of monomers are typical: the amount of $C_8$ to $C_{30}$ alkyl (meth)acrylate monomers is typically in the range of from 70 to 99 weight percent, the amount of hydrophobic comonomers is typically in the range of from 1 to 30 weight percent, the amount of hydrophilic monomers is typically in the range of from 0.5 to 2 weight percent. The amount of chain branching units will be up to 0.10 weight percent based on the amount of $C_8$ to $C_{30}$ alkyl (meth)acrylate monomers.

Dispersions of hard polymer particles and/or hard mineral particles are also added in certain embodiments to improve recovery of the polymer particle dispersions to a powder form, such as by spray drying. In these embodiments the weight percentages of these hard particles is typically kept less than 50 weight percent, more typically less than 35 weight percent, and most typically in the range of from 10 to 25 weight percent.

While any morphological structure comprising the polymeric composition of the present invention would be useful for increasing the melt strength of thermoplastic materials, typical polymer particle morphologies include those characterized as "spherical", "multi-lobal" (e.g., two or more polymer particles that are stuck together to form a non-spherical particle), "core-shell" (e.g., a spherical polymer phase surround by shells of additional polymer phases), "multiple domain" (e.g,. larger spherical polymer domains containing discontinuous domains of one or more separate polymer phases), "co-continuous" (e.g,. larger spherical polymer domains containing continuous domains of one or more separate polymer phases), etc.

While any one particular morphology is not required for the invention, in certain embodiments of the present invention, the polymer particles are provided as spherical or core-shell polymer particles. Core-shell polymer particle morphologies are particularly useful for providing dry powders of the polymer compositions. In these embodiments, one or more shells of a hard polymer having a glass transtion temperature greater than 25° C. is formed in the presence of a spherical polymer particle of the polymeric compostion using one or more of the previosly mentioned polymerization methods. While such soft-core//hard-shell morphologies are useful in certain embodiments of the present invention, such hard shell polymers are not necessary to isolate the polymeric composition by direct extrusion.

The diameter of the polymer particles can be essentially any size that can be provided by single-staged and multi-staged emulsion polymerization methods. Mean polymer particle diameter is typically in the range of from 10 to 30,000 nm, and more typically in the range of from 30 to 5,000 nm. In one embodiment of the present invention where the polymer particles are prepared using lauryl methacrylate, the mean polymer particle diameter is in the range of from 180 to 350 nm. In another embodiment of the present invention where the polymer particles are prepared using stearyl methacrylate, the mean polymer particle diameter is in the range of from 100 to 900 nm.

In the certain embodiments wherein the polymeric composition contains a polymeric flow aid, the amount of flow aid is typically present up to 50 weight percent, more typically in the range of from 10 to 40 weight percent, and even more typically in the range of from 15 to 30 weight percent, these weight percentages being based on total weight of the polymeric composition. Accordingly, in these embodiments, the at least one polymer derived from polymerizable units derived from at least one $C_8$ to $C_{30}$ alkyl (meth)acrylate monomer, and at least one chain branching unit is present in an amount of less than 100%, typically in the range of from 60 to 99.95 weight percent, and more typically in the range of from 75 to 99.5 weight percent, these weight percentages are based on total weight of the polymeric composition. Additionally, optional additives may be present in these compositions as follows: thermal stabilizers in the range of from 0 to 10 weight percent, mineral flow aids in the range of from 0 to 5 weight percent, post-addition surfactants in the range of from 0 to 5 weight percent, and coagulants in the range of from 0 to 5 weight percent, these weight percentages are based on total weight of the polymeric composition.

In the process for making the polymeric additive compositions, the types of polymerizations that may used to form the polymeric additive compositions include conventional or "classical" emulsion (gradual addition/shot), mini-emulsion solution and bulk, and any of these types of polymerization may proceed through the reaction mechanisms of radical chain (addition) or step reaction (condensation). Typically, free-radical emulsion polymerization is used as it readily forms polymer particles that can have a range of morphologies.

In the process for making the polymeric additive compositions, it is typical to use emulsion polymerization that is suitable for polymerizing hydrophobic monomers. By emulsion polymerization is meant the polymerization process which is carried out in an aqueous media with water-insoluble or slightly water-soluble monomers to form an emulsion of ethylenically unsaturated monomer droplets stabilized by one or more emulsifiers. The monomers are polymerized using a free radical initiator to form a dispersion of polymer particles. The resulting polymer particle dispersion typically has a mean particle size of less than 1000 nm. Multistaged polymerization and/or agglomerating methods are also known which can provide various combinations of core and shell type polymer particles up to about 30 microns (30,000 nm) in diameter.

Avoiding the gelled polymer chains while maintaining a molecular weight greater than 100,000 g/mol is provided by including in the monomer mixture at least one chain branching monomer. While the chain branching monomer is present in an amount not greater than 0.10 weight percent, typically this amount is between 0.005 weight percent and 0.08 weight percent, more typically between 0.01 and 0.07 weight percent, and even more typically between 0.02 and 0.05 weight percent, said weight percentages based on the total weight of the $C_8$ to $C_{30}$ alkyl (meth)acrylate monomers.

Any chain branching monomer containing two or more chain reactive chemical groups are suitable for providing the high molecular weight while providing non-gelled polymer chains. Suitable examples of chain brancing monomers for providing the chain branching units include monomers that can provide at least two sites for the free-radical process to continue. Allyl methacrylate (ALMA), butylene glycol dimethacrylate (BGDMA), trimethylolpropane ethoxylate methyl ether diacrylate, trimethylolpropane ethoxylate triacrylate, trimethylolpropane triacrylate (TMPTA), trimethylolpropane trimethacrylate (TMPTMA) are suitable examples. ALMA is a particularly useful chain branching monomer as it also helps to prepare polymer shells adjacently external to inner polymer shells and polymer particles.

A chain-transfer agent may also be incorporated in certain embodiments of the polymerization process of the present invention for controlling end-group chemistry and/or polymer chain molecular weight.

Emulsion polymerization processes are particularly effective at providing the chain-branched $C_8$ to $C_{30}$ alkyl (meth) acrylate polymers in the form of a particle dispersion having one or more phases. In one embodiment, the particles contain both hard phases and soft phases. While any combination of hard and soft phases is possible, in a preferred embodiment the polymer particles have a hard phase external to an inner soft phase. Typically the high-alkyl (meth) acrylate polymers will provide a soft phase that will tend to be sticky and difficult to handle. Accordingly, in certain embodiments, a hard phase can be added external to the soft phase to improve the ability to handle the high-alkyl (meth) acrylate polymers in readily handleable form, such as a wetcake, powder, tablet, pellet, bead, film, or extrudate.

While the aqueous emulsion polymerizations of the present invention require basically water, monomer emulsion, and initiator, other materials are also known to be useful in preparing emulsion polymerized polymer particle dispersions. In several embodiments of the the process of the present invention, additional materials that may be present in the polymerization process include one or more of the following: monomer transport aid such as methyl beta cyclodextrin or similar derivatives, surfactants, stabilizers, polymeric flow aid, mineral flow aid, buffer, thermal stabilizers, and initiators and activators. The additional materials are useful for the following purposes: monomer transport aid helps transport the hydrophobic monomers through the aqueous phase, thereby lowering the amount of surfactant needed for emulsification; surfactant emulsifies monomers, also referred to as "emulsifiers"; initiators and activators initiate free-radical polymerization of ethylenically unsaturated monomers and reduce the concentration of ("chase down") residual monomers at the end of the polymerization. Thermal stabilizers allow processing at high temperatures to minimize thermal degradation of the polymeric composition; buffers adjust the pH; surfactants are often added to improve emulsion/shear stability. Typically the levels of these materials are provided at less than 10 weight percent, more typically less than 5 weight percent, and even more typically less than 2 weight percent, these weight percentages based on total weight of the polymer particles.

It is known that it is difficult to polymerize monomers such as high-alkyl (meth)acrylates, which are almost completely insoluble in water, with conventional amounts of emulsifiers and those conventional initiators which are effective for polymerizing lower alkyl (meth)acrylate monoers, such as ethyl acrylate or methyl methacrylate. Various methods are available for polymerizing high-alkyl (meth)acrylate monomers to high conversion at acceptable rates, such as the use of a carrier for the monomer, such as cylcodextrin, or by adding a low level, such as about 5 to 10 percent by weight monomer, of methyl methacrylate, which is then polymerized, after completion of the polymerization of the high-alkyl (meth)acrylate. Some of these methods adversely affect the molecular weight of the high-alkyl (meth)acrylate polymers and cause an excess of gelled polymer chains.

While one polymerization stage is sufficient to prepare the polymer particles of the present invention, various embodiments of the present inveiton utilize two or more polymerization stages ("multi-staged"). In certain embodiments of the present invention, a three-stage plus initial polymer seed process is utilized for preparing dispersions of polymer particles containing the polymeric composition which is particularly useful for isolating the polymer particles into a powder form. The initial polymer seed particles are provided to control the overall particle size distribution. Typical seeds that work well are prepared from butyl methacrylate.

While the emulsion polymerization processes operates over a wide range of pH, it is typical for the pH to be in the range of from 3 to 8.

The solids percent weight fraction of the polymer particles in the aqueous dispersion is typically in the range of from 10 to 70 weight percent, more typically in the range of from 25 to 60 weight percent, and even more typically in the range of from 38 to 51 weight percent.

In the process for preparing an aqueous dispersion of polymer particles, the polymerization step is typically carried out at temperatures in the range of from 40 to 120° C., more typically in the range of from 50 to 100° C., and even more typically in the range of from 80 to 90° C. Polymerization pressures are typically carried out pressures below 1000 PSIA, more typically below 100 PSIA, and even more typically at ambient pressure.

While any type of polymerization reaction equipment is suitable for conducting the process, so long as the material is mixed and conveyed to the reactor, a stirred tank reactor is more typically used.

In several embodiments of the process of the present invention, the aqueous emulsion of hydrophobic monomer droplets are prepared using high shear means to provide a mean droplet diameter of less than 30 microns. Different ways of providing high shear means include homogenization using one or more of many commercially-available homogenization units, such as Greerco or Virtis homogenizers, to get hydrophobic monomer well-dispersed into uniform sized droplets.

The monomer emulsion droplets of long chain $C_N$ alkyl (meth)acrylate monomers and chain branching monomers are prepared using high shear to produce very small droplets. The smaller the droplet the better the polymerization process because monomer transport is enhanced. Various methods can be used to achieve this goal. Batch homogenizers, multi-stage homogenizers, high pressure homogenizers, ultrasonicators, and megasonicators can be used. While ultrasonic method is desirable for achieving very small droplets, it is generally more practical to use a commercially available "Ross" mixer, followed by a homogenizer and an in-line emulsifier. Various equipment for undertaking these steps are known to the industry. Typically, small droplet size is desirable, and can be achieved by a combination of the proper device with suitable combinations of monomer to water to soap ratios.

The range of monomer emulsion droplet sizes are typically kept below 30 microns. Larger particle sizes tend to result in slower processes, resulting in an excess of residual monomer. More typically, the emulsion particle sizes are kept below 5 microns, even more typically less than 2 microns, and typically, less than 1 micron.

The range of monomer emulsion concentrations is typically in the range of from 50 to 90 weight percent, more typically in the range of from 60 to 70 weight percent. Since there is a dependence on monomer/water/emulsifier concentration ratios, the minimum concentration will depend on the concentration that is required to emulsify. If the monomer concentration is too low then emulsification will be difficult. If the monomer concentration is too high then emulsification will either not form, and/or it will be difficult to pump into the polymerization vessel.

The conditions which are important to get reproducibility include accurate control of emulsifier, water and shear rate during emulsification process.

In one embodiment of the present invention, monomer droplets smaller than 1 micron can be prepared by ultrasonication. Droplets of about 1.35 micron in diameter can be prepared using a Ross mixer.

In order to control the molecular weight and minimize the amount of gelled polymer chains the feed rates and amounts are strictly controlled. If the feed rate is too high then excess monomer will tend to react quickly and form gelled particles. Molecular weight is also controlled by incorporating one or more chain transfer agents.

In certain embodiments of the present invention, the polymerization conditions include polymerization of the C8 to C30 monomers with the chain branching monomer. Additional embodiments further incorporate one or more inner shell polymers that are beleived to function as a tie-layer to an outer hard shell polymer. Additional embodiments include polymerizing additional high Tg monomers to form a hard polymer shell around the inner polymer tie-layer.

In another embodiment, polymer seed particles based on butyl methacrylate monomer units are provided to the reaction medium, followed by addition of emulsifed monomers containing lauryl methacrylate and allyl methacrylate chain branching monomers which are subsequently polymerized to greater than 90 weight percent monomer conversion, which is followed by polymerization of an inner shell polymer containing a copolymer styrene/methyl methacrylate/methacrylic acid. This, in turn, is followed by polymerization of an outer hard shell polymer layer containing greater than 90 weight percent of methyl methacrylate, and less than 5 weight percent each of butyl acrylate and methacrylic acid. In this embodiment, the relative amounts of each stage is as follows: seed is 3.5 parts (45 BMA/40 BA/14 MMA/1 MAA); emulsifed monomers is 66.5 parts (98.94% lauryl methacrylate with 1% methacrylic acid and 0.06% allyl methacrylate chain branching units); inner polymer shell is 10 parts (styrene-methyl methacrylate-high 2.5% methacrylic acid); outer polymer shell is 20 parts (98% methyl methacrylate—1% butyl acrylate—1% methacrylic acid).

In another embodiment of the present invention, one process includes the following steps in a polymerization vessel: Start with water. Inert with nitrogen gas. Add chain transport agent and surfactant. Add buffer and initiator. Add acrylic seed to set particle size. Add initiator. Add monomer emulsion which has been homogenized to provide small emulsion droplets less than 1 micron in diameter. Polymerize at 85° C. using thermal polymerization. Hold at temperature. Add the tie layer inner polymer shell monomers. Polymerize at 85° C. Hold at temperature. Add the outer hard polymer shell monomers. Polymerize at 85° C. Post-add surfactant, thermal stabilizers (melted and homogenized) and polymeric flow aid dispersion.

In the process of the present invention, the polymerization step is initiated using a free-radical initiator system. These initiator systems are characterized as either redox or thermal. Persulfates are used in both redox and thermal initiator systems.

Conventional free radical initiators (oxidants) which may be used in addition to 0.01–1.0%, by weight based on the total weight of the polymer, t-alkyl hydroperoxide, t-alkyl peroxide, or t-alkyl perester wherein the t-alkyl group includes at least 5 carbon atoms, typically 0.01–1.0%, by weight based on the total weight of the polymer, t-alkyl hydroperoxide wherein the t-alkyl group includes at least 5 carbon atoms; and more typically 0.01–1.0%, by weight based on the total weight of the polymer, of t-amyl hydroperoxide include, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using one or more of the same initiators and a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadine-sulfinic acid, hydroxymethanesulfonic acid, sodium 2-hydroxy-2-sulfinatoacetic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

By "in the presence of 0.01–1.0%, by weight based on the total weight of the polymer, t-alkyl hydroperoxide, t-alkyl peroxide, or t-alkyl perester (collectively referred to as "t-alkyl reactants") wherein the t-alkyl group includes at least 5 carbon atoms" is meant that the cumulative amount of t-alkyl reactants wherein the t-alkyl group includes at least 5 carbon atoms which has been added to the reaction zone wherein at least some of the monomers are being converted to the emulsion polymer is 0.01–1.0%, by weight based on the total weight of the polymer; optionally wherein at least 95%, typically the last 95%, by weight of the monomers are being converted to the emulsion polymer; optionally wherein at least 75%, typically the last 75, by weight of the monomers are being converted to the emulsion polymer; optionally wherein at least the last 50% by weight of the monomers are being converted to the emulsion polymer; and optionally wherein at least the last 20% by weight of the monomers are being converted to the emulsion polymer. The optional additional oxidant includes those listed hereinabove as conventional free radical initiators, typically the optional additional oxidant(s) are less that 50% by weight of the total amount of initiator/oxidant. In this embodiment the t-alkyl reactants wherein the t-alkyl group includes at least 5 carbon atoms initiators may be used as such or as the oxidant components of redox systems using the same initiators coupled with a suitable reductant such as those listed hereinabove.

In one specific embodiment of the process of preparing the polymer particle dispersions, "chaser" additives are added to the dispersion to reduce the concentration of unreacted residual monomers. Typical chaser additives include FeSO4 or Fe-EDTA promoter, isoascorbic acid or SFS activator) and tBHP catalyst to remove residual monomers. In another embodiment of the present invention, a t-alkyl reactant is substituted for the tBHP in the aforementioned embodiment to provide polymeric compositions that maintain their activity as melt strength additives over time.

While not being limited by theory, apparently t-alkyl reactants minimize the amount of residual monomer and completes the polymerization process. t-alkyl reactants, therefore, appear to provide free radicals. However, an important distinction is that t-alkyl reactants produce upon decomposition CH3CH2• radicals, which are not as active as the CH3• radicals produced by tBHP. Therefore, t-alkyl reactants do not induce post-reactions that, in the long run, appear to be deleterious to product performance ("aging"). While gelled polymer chains are typically observed at some point during the process with tBHP, the process with t-alkyl reactants is typically free of gelled polymer chains.

Other preparative methods are also useful for forming the high-alkyl (meth)acrylate polymers. Solution polymerization may be employed, using levels of initiators, chain branching units, and high-alkyl (meth)acrylate monomers to achieve the desired molecular weight that contains non-gelled polymer chains. Suspension and non-aqueous dispersion methods may also be utilized as long as the amount of chain branching units is in an amount not greater than 0.10 weight percent based on total weight of the $C_8$ to $C_{30}$ alkyl (meth)acrylate monomer.

The polymeric material is typically isolated from the reaction medium. If the polymer is not prepared as a solid material, it may be isolated from the polymerization medium as a powder by spray drying, or by coagulation and drying. The polymeric composition can also be made into a pellet concentrate (e.g., 20 to 80 weight percent polymeric material blended with 80 to 20 weight percent of a thermoplastic resin) by direct extrusion of the emulsion in an extruder with a thermoplastic resin. During the isolation process to form a powder, the particle size morphology typically increases to a range of from about 50 to 150 microns in diameter as the polymer particle dispersion dries.

The polymeric compositions of the present invention have many uses. Primarily, they are used as additives for thermoplastic resins to aid one or more of the following polymer processing operations: thermoforming; calendering; foam production; blow molding and extrusions. While the polymeric composition has uses in virtually all thermoplastic polymer resins, it is particularly useful for increasing melt strength in polyolefin polymers.

The polymeric materials of the present invention offer advantages over the current products. The new polymeric compositions are produced economically, provide improved melt strengths over grafted polyolefins, and appear to work well for many grades of polyolefins used in injection molding and extrusion.

The polymer particles of the present invention may be further processed after isolation. The polymer particles can be pelletized neat, or added with another resin to prepare a pellet concentrate. Such processing may be accomplished using a two roll mill, and subsequently pressing the polymer into a molded plaque for testing. Alternatively, the polymer particles could be extruded with a thermoplastic resin and thermoformed into an article.

The polymer blend compositions of the present invention contain a blend of at least one thermoplastic polymer resin, and at least one of the polymeric compositions described in the earlier embodiments of the present invention. As a melt strength additive for thermoplastic resins, the amount of the additive polymeric composition in the polymer blend will be at least 0.1 weight percent, typically at least 1 weight percent, and more typically at least 3 weight percent. Likewise, the amount of the additive polymeric composition in the polymer blend will be no greater than 20 weight percent, typically no greater than 15 weight percent, and more typically no greater than 10 weight percent. These weight percentages are based on the total weight of the polymer blend composition.

The polymer blends of the present invention can be prepared by any of the known polymer processing operations known in the art. Typical examples include compounding, extruding, powder blending, melt blending, and solution blending.

The polymer blends of the present invention have many uses such as thermoprocessable resins for preparing plastic articles and additive concentrates. When used as thermoprocessable resins in such operations such as thermoforming which require high melt strength, it is desirable t be able to determine the increase in melt strength as a function of polymeric additive concentration in such polymer blends.

The increase in melt strength is determined by testing blends of the polymeric composition with the thermoplastic polymer resins for recoverable compliance, $J_o$, using a suitable stress rheometer instrument, such as commercially available from Bohlin instruments. Another way to measure the improvements to the thermoplastic resin's melt strength is by a sag test after milling or after extruding. Thermoforming of thermoplastics blended with various amounts of the polymeric compositions of the present invention also show improved dimensional stability of the blend versus that of the thermoplastic resin alone.

In thermoforming, the semi-finished product, either a sheet or plate, is fixed, within a frame or mold, and then heated by irradiation, hot platen, or hot air convection. The lower and upper forming temperatures can be evaluated by measuring the surface temperature of the sheet with a suitable device, such as an infrared pyrometer. For example, these temperatures may range from 198 to 224° C., depending on the material. The difference between the lower and upper temperatures provides a thermoforming window. Depending on the polyolefin, this temperature range might occur at lower temperature, for example, 160 to 170° C., and generally includes the melting point of the polyolefin itself. This "window" correlates with the Bohlin rheometer test result of characteristic time, which is the product of melt viscosity and recoverable compliance.

In other embodiments of the present invention are provided articles prepared from thermoplastic resin blends containing at least one thermoplastic resin and the polymeric composition. A number of articles prepared with the composition blends include instrument panels in cars, injection molded parts, barrels, large auto parts, ice chests, refrigerator parts, and resilient flooring.

EXAMPLES

TABLE

Materials Used in the Examples

| Generic Name | Abbrev. | Source |
|---|---|---|
| Methyl methacrylate | MMA | Rohm and Haas Co. |
| n-butyl acrylate | BA | Rohm and Haas Co. |
| Lauryl methacrylate | LMA | RohMax Inc. (Houston, TX) |
| n-Butyl methacrylate | BMA | Rohm and Haas Co. |
| Glacial methacrylic acid | MAA | Rohm and Haas Co. |
| allyl methacrylate | ALMA | Aldrich |
| trimethylolpropane triacrylate | TMPTA | Aldrich |
| Styrene | STY | Huntsman Chemical |
| Fatty alcohol Ether Sulfate, Sodium Salt Solution | FES-32 | Henkel Corporation (Ambler, PA) |
| Sodium dodecyl benzene sulfonate | SDDBS | Stepan Company (Northfield, IL) |
| nonionic surfactant | XN-45S | Union Carbide (Bound Brook, NJ) |
| n-dodecyl mercaptan | nDDM | Aldrich |
| Sodium carbonate | Na2CO3 | Aldrich |
| Calcium chloride | CaCl2 | Aldrich |
| t-butyl hydroperoxide | tBHP | Aldrich |
| t-amyl hydrogen peroxide | tAHP | AtoFina |
| cumene hydroperoxide | CHP | AtoFina |
| sodium persulfate | NaPS | AtoFina |
| Isoascorbic acid | IAA | AtoFina |
| Polypropylene copolymer | PP-14SO5A | Huntsman |
| Neat Polypropylene | PP-6310 | Huntsman |
| Methyl beta cyclodextrin solution | CD | Wacker Biochem Corp. (Adrian, MI) |
| Phenolic stabilizer | GP45 | Great Lakes Chemical |
| Phenolic stabilizer | PP-18 | Great Lakes Chemical |
| Ferric monosodium ethylenediaminetetraacetate dihydrate | Fe-EDTA | Lidochem, NJ (Hazlet, NJ) |

A variety of different examples provided herein show the manufacture of such additive materials most effectively by the novel emulsion polymerization techniques of the present invention. Single-stage emulsion polymerizations are quite effective. Additives so produced can be freeze-dried and then compounded with polypropylene or, alternatively, compounded directly with the polyolefin in a device like a devolatilizing extruder to remove the water.

Certain additives can be used in combination with each other as blends. In particular, reactive blends of two emulsions, one with an acidic functionality and the other with an epoxide functionality, can be used to obtain very efficient sag resistance when added together to a polyolefin.

Many of the examples provided here, on the other hand, suggest using multi-stage emulsion polymerization processes, since such processes allow the formation of soft core-hard shell additive materials. Polymerizing a hard, high Tg shell as a second (or even a third) stage in the polymerization process facilitates isolating the emulsion by means of spray drying or coagulation to form the additive in free-flowing powder form. The additive so formed can then be compounded in powder or pellet form with polyolefins to form a high melt-strength material. The concentration of the additive so produced can be chosen to get an optimal balance of cost, sag performance and other key properties like melt rheology.

A test protocol is provided using a rheometer to determine the recoverable compliance and viscosity of plastic materials simultaneously. By blending of the additive materials with polyolefins, mixing them on a roll mill or suitable mixing device, and then applying this rheological test, the sag resistance is determined straightforwardly, by measuring these two rheological attributes. In the examples, the Jratio is reported, defined as the recoverable compliance for the polyolefin compounded with the additive to that of a polyolefin control with no additive. Additionally, the characteristic time, defined as the product of the recoverable compliance and viscosity, also provides useful information related to sag resistance and melt strength, as this time gives an indication how long one can process such materials without serious deformation of the compounded part.

Example 1

This example provides a high molecular weight high-alkyl (meth)acrylate polymer composition based on lauryl methacrylate and 0.058 weight percent (based on lauryl methacrylate) of ALMA chain branching units. This example also provides a process for preparing an aqueous dispersion of polymer particles of such compositions. The process provides one-stage spherical particles, two-stage core-shell polymer particles, and three-stage core-inner shell-outer shell polymer particles.

A charge consisting of 39.2 parts of deionized water, 0.36 parts of Disponil (TM) FES 32 (aqueous, 30% solids, Henkel) and 1.45 parts of CD was added to an appropriate reactor, which was fitted with a condenser, a means for agitation, and means of temperature measurement. Nitrogen gas was added to sweep the surface of this aqueous mixture while the reactor contents were heated to 85° C.

While the mixture was heated up, four emulsified monomer mixes (EMM's) were prepared. The seed EMM consisted of 3.27 parts deionized water, 0.036 parts of Disponil FES 32, 1.640 parts of butyl methacrylate, 1.60 parts of methyl methacrylate, 0.36 parts of butyl acrylate, and 0.036 parts of methacrylic acid.

The first-stage EMM consisted of 22.2 parts deionized water, 0.67 parts of Disponil FES 32, 66.0 parts of lauryl methacrylate, 0.67 parts of methacrylic acid and 0.038 parts of allyl methacrylate.

The second-stage EMM consisted of 3.17 parts deionized water, 0.095 parts of Disponil FES 32, 4.71 parts of methyl methacrylate, 4.71 parts styrene, 0.24 parts of methacrylic acid and 0.005 parts of allyl methacrylate.

The third-stage EMM consisted of 6.66 parts deionized water, 0.20 parts of Disponil FES 32, 19.6 parts of methyl methacrylate, 0.20 parts of butyl acrylate, and 0.20 parts of methacrylic acid.

Mild agitation was used to emulsify three of the four EMM's listed above. The first-stage EMM was homogenized using a Cyclone™ I.Q.$^2$ homogenizer, specially equipped with a Sentry™ microprocessor. This device was operated at 20,000 rpm for 2 minutes to obtain a stable EMM.

With the temperature stable at 85° C. and the N2 sweep on for at least 30 minutes, 0.385 parts of sodium carbonate dissolved in 2.18 parts deionized water was added to the reactor, followed by 0.385 parts of sodium persulfate dissolved in 2.18 parts deionized water, decreasing the temperature to 82° C.

Then the seed EMM described above was added. Within a few minutes, a 3 degree exotherm was detected. Ten minutes after adding the seed EMM, a mixture consisting of 0.065 parts of sodium persulfate and 15.2 parts deionized water was added over a 130 minute period. Simultaneously with the start of the cofeed catalyst mixture, the first-stage EMM was gradually added over 85 minutes. Temperature was maintained at 85° C. during this feed. The first-stage EMM was rinsed in with 3.37 parts deionized water, then a 2.80 part sample was removed. The second-stage EMM was then added over 21 minutes. At this point, the second-stage EMM was flushed with 0.842 parts deionized water, and a second 2.80 part sample was removed from the mixture. Temperature was still maintained at 85° C. Then, the third-stage EMM was added over 25 minutes, during which a slight exotherm took place. The reaction mixture was cooled back to 85° C. and the third-stage EMM feed continued until it was completed, at which point it was flushed with 1.78 parts of deionized water. The cofeed catalyst feed ended at the same time the third-stage EMM feed was completed. It was rinsed into the reactor with 0.726 parts deionized water. The reaction mixture was cooled to 60° C.

Residual monomer was reduced by the addition of 0.021 parts ferric monosodium ethylenediaminetetraacetate dihydrate, 0.105 parts of 70% aqueous tert-butyl hydroperoxide, 0.053 parts of isoascorbic acid and a total of 4.56 parts deionized water. The mixture was allowed to react for 20 minutes, at which point the Nitrogen sweep was turned off, the mixture was cooled to 40° C., and the agitation was shut off, and the batch removed and sampled.

The first-stage solids (measured by heating 1 gram for 30 minutes in a heated, vented 150° C. oven) was 42.2%, based on a theoretically calculated value of 44.4%; the peak molecular weight of the first-stage polymer particle was greater than 100,000 g/mol; the second-stage solids was 44.2% based on a 46% calculated theoretical value; the final solids was 48.4% based on a 48.9% calculated theoretical value. The final emulsion particle size (determined by a Brookhaven BI-90 analyzer) was 305 nm. The final pH was 6.03. This was adjusted to 7.06 with a very small amount of aqueous (28%) ammonium hydroxide. The peak average molecular weight measured by GPC was 540,000 g/mol for the final three-staged polymer, and its weight average molecular weight was 1.08 million.

Example 2

This example provides a high molecular weight high-alkyl (meth)acrylate polymer composition based on lauryl methacrylate and 0.080 weight percent (based on lauryl methacrylate) of ALMA chain branching units. This example also provides a process for preparing an aqueous dispersion of polymer particles of such polymer compositions. The process provides one-stage spherical particles and two-stage core-shell polymer particles.

This example is similar to Example 1, but with the following changes. The initial charge consisted of 51.0 parts of deionized water. The reactor was sparged with nitrogen for 30 minutes while heating to 55° C. The Nitrogen sparge was changed to a sweep. After switching to a sweep, 0.00082 parts of ferric monosodium ethylenediaminetetraacete dihydrate, 0.355 parts of Disponil FES 32, and 1.42 parts methyl beta cyclodextrin,), 0.025 parts of acetic acid, 0.213 parts of sodium sulfoxylate formaldehyde, and 7.90 parts of an acrylic seed emulsion (aqueous, 45% solids, 100 nm) was added to the reactor.

The first-stage EMM consisted of 25.6 parts deionized water, 0.782 parts of Disponil FES 32, 73.8 parts of lauryl methacrylate, 0.059 parts of allyl methacrylate, and 0.746 parts of methacrylic acid.

The second-stage EMM consisted of 11.3 parts deionized water, 0.508 parts of Disponil FES 32, 24.9 parts of methyl methacrylate, 0.254 parts of butyl acrylate, and 0.254 parts of methacrylic acid.

The first-stage EMM was added to the reactor in three portions. The first portion, comprising 15% of the total of the first-stage EMM, was added with the reactor at 55° C. Then, 0.029 parts of cumene hydroperoxide was added and rinsed in with 0.138 parts of deionized water. The reaction mixture exothermed 4° C. Then the second portion, comprising 40% of the total of the first-stage EMM, was added with the reactor at 55° C. Then, 0.077 parts of cumene hydroperoxide was added and rinsed in with 0.277 parts of deionized water. The reaction mixture exothermed 13° C. Then the third and final portion, comprising 45% of the total of the first-stage EMM, was added with the reactor at 58° C. 0.086 parts of cumene hydroperoxide was added and rinsed in with 0.277 parts of deionized water. The reaction mixture exothermed 14° C. The first-stage EMM was rinsed to the reactor with 1.39 parts of deionized water. 0.762 parts of a 5% aqueous solution of tert-butyl hydroperoxide and 2.15 parts of a 2% aqueous solution of sodium formaldehyde sulfoxylate was also added.

The second-stage EMM was added to the reactor gradually over a 60 minute period. Simultaneously, a solution consisting of 0.063 parts of sodium persulfate in 2.398 parts of deionized water was pumped in over the same time period. A second solution consisting of 3.17 parts of a 2% aqueous solution of sodium formaldehyde sulfoxylate was also pumped in at the same time. During the feed an exotherm was detected to 55° C. The temperature was controlled at this point for the remainder of the process.

At the conclusion of the feeds, the second-stage EMM was rinsed into the reactor with 1.39 parts of deionized water and the residual monomer chased with 1.52 parts of a 5% aqueous solution of tert-butyl hydroperoxide and 4.15 parts of a 2% aqueous solution of sodium formaldehyde sulfoxylate. The pH was adjusted with 1.39 parts of a 5% sodium carbonate aqueous solution. The batch was cooled to below 40° C. and sampled.

The solids measured for the aliquot sample taken after stage I was 47.8%, based on a theoretically calculated solids of 48.9%. The particle size was 245 nm. The peak average molecular weight based on GPC was 216,000, and the weight average was 927,000. The solids measured for the final sample was 45.3%, based on a theoretical value of 49.6%. The final particle size was 274 nm. The peak average molecular weight based on GPC of the final sample was 236,000, and the weight average was 756,000 g/mol

Example 3

This example provides polymer blend compositions in which various polymer particles produced in Example 1 are taken at various stages of the process and isolated and compounded with polypropylene. The example also provides for high molecular weight high-alkyl (meth)acrylate polymer compositions which be provided in various aqueous and dried powder forms. Any of these forms can be used to improve the melt strength of thermoplastic resins. This example also provides various processes for preparing an aqueous dispersion of polymer particles of the present invention.

Portions of the emulsion described in Example 1 were taken and compounded with polypropylene. Specifically, stage II and final emulsion were freeze-dried by placing them in an aluminum tray surrounded by dry ice. After the emulsion was frozen, it was placed in a vacuum oven maintained at 25 inches water and 50° C. for sixteen hours. The frozen, dried samples were then blended with Polypropylene on a mill roll at 165° C. for three minutes. Generally, a 5% loading of additive was used. The results of the Bohlin rheometer testing is as follows:

| Example | Viscosity (Pa sec) | Recoverable Compliance (1/Pa) | Recoverable Compliance Jratio | Stage/Conditions |
|---|---|---|---|---|
| R1 | 5.84E + 04 | 6.77E − 04 | 1.10 | Neat Polypropylene 6310, from Huntsman |
| 3a | 6.23E + 04 | 1.75E − 03 | 2.85 | II, freeze-dried, 5% Loading |
| 3b | 6.00E + 04 | 2.33E − 03 | 3.79 | Final, freeze-dried, 5% Loading |
| 3c | 6.46E + 04 | 2.39E − 03 | 3.89 | Repeat of Above |
| 3d | 1.25E + 05 | 4.30E − 03 | 7.00 | 14.5% Loading |

The reference example R1, is included here to show how the particular polypropylene performs without any additive.

These results show that the recoverable compliance—a measure of sag resistance—is remarkably and reproducibly improved when even as little as 5% additive is added. Even more dramatic improvement is realized as the concentration increases.

The final emulsion obtained from Example 1 was then diluted with deionized water to 30%, based on the solids calculated above. This emulsion was blended with a second emulsion, which we designated the flow aid emulsion. This second flow aid emulsion was polymerized in a similar manner to that described in U.S. Pat. No. 3,833,686. The flow aid emulsion consisted of 90 parts methyl methacrylate and 10 parts butyl acrylate. It is an aqueous-based emulsion, initiated in two monomer shots in the presence of 1.31 parts of sodium lauryl sulfate surfactant (28%), 0.04 parts sodium chloride, 0.0318 parts of acetic acid, 0.0002 parts ferrous sulfate, 0.08 parts tert-butyl hydroperoxide and 0.082 parts sodium formaldehyde sulfoxylate. Its molecular weight is 130,000 by GPC. The flow aid emulsion was polymerized at 42% solids.

This second emulsion was diluted to 30% solids. The two emulsions described above were blended together: 100 parts of the diluted emulsion described in the above and either 25 or 50 parts of the diluted "flow aid" emulsion. These two diluted emulsion blends were then spray-dried in a lab spray dryer (Niro) using an inlet temperature of 140° C. and an outlet temperature of 60° C. A free-flowing fine powder was obtained. This powder blend was also tested for recoverable compliance. Results are summarized as follows:

| Example | Viscosity (Pa sec) | Recoverable Compliance (1/Pa) | Recoverable Compliance Jratio | Stage/Conditions |
|---|---|---|---|---|
| 3e | 6.06E + 04 | 1.37E − 03 | 2.23 | 50 parts flow aid emulsion added to form spray-dried blend |
| 3f | 5.11E + 04 | 1.63E − 03 | 2.65 | 25 parts flow aid emulsion added to form spray-dried blend |

Example 4

Samples from the stage I polymer particle dispersion and the final polymer particle dispersion described in Example 2 were freeze-dried, then compounded and tested as described in Example 3. Results are as follows:

| Example | Viscosity (Pa sec) | Recoverable Compliance (1/Pa) | Recoverable Compliance Jratio | Stage/Conditions |
|---|---|---|---|---|
| 4a | 5.60E + 04 | 1.18E − 03 | 1.92 | Huntsman 6310 Neat PP with 5% stage I (Ex. 2) freeze-dried emulsion added |
| 4b | 5.51E + 04 | 8.37E − 04 | 1.36 | Huntsman 6310 Neat PP with 5% final (Ex. 4) freeze-dried emulsion added |

These results show that the recoverable compliance—a measure of sag resistance—is improved by the addition of the additive described in Example 4. The peak average molecular weight based on GPC was 236,000 g/mol.

Example 5

This example shows how the Jratio of polypropylene blends, degree of gelling, and molecular weight varies with the relative amount of chain branching monomer in the emulsion monomer mixtures. This example shows that the weight percentage of chain branching monomer should be no more than 0.10 weight percent based in amount of high-alkyl (meth)acrylate, since this amount of chain branching monomer results in production of polymeric compositions having no gel (i.e., having non-gelled polymer chains).

Three-stage polymer particles comprising the polymeric composition of the present invention as the core stage, were provided according generally to the process described in Example 1 with varying amounts of ALMA chain branching monomers. The polymer particles were prepared from Stage I LMA-based polymer particles, thermal stabilizer, and a flow aid as provided in Example 3. The polymer particles were first tested for the presence of gelled polymer chains as follows.

A fixed amount of the polymeric composition to be tested (in the form of dry solid material) is placed in tetrahydrofurane ("THF") at room temperature. THF is chosen because it is known to be a good solvent for these types of materials, but other solvents, such as toluene or similar solvents can be used. Preferably, the polymeric composition makes up about 5 to 10% by weight of the total mixture of solvent and polymeric composition. For example, 9.5 grams of THF and 0.5 grams of solid material are added together to make a 10-gram blend. The mixture is placed in a tightly sealed vial and placed in a shaking device that shakes the mixture for several hours, preferably overnight (for example, from 8 to 12 hours) to ascertain that the mixture has reached equilibrium.

After the mixture has been treated as above, it is visually examined. A clear, fully homogeneous solution with no visible gelatinous material present will indicate that the polymeric composition is fully soluble and, therefore, it is made up of "non-gelled polymer chains". In contrast, a polymeric composition that contains "gelled polymer chains", which is not in accordance with the present invention, will produce a visible gelatinous substance in the mixture. This gelatinous substance is generally visually distinguishable in the mixture of solvent and polymeric composition because it consists of solid material which is swollen with solvent and behaves in a rubber-like manner. It can be further separated from the rest of the material by decanting off the supernatant solvent, by filtration, or by centrifugation of the solvent.

In many cases the original solvent-polymeric composition mixture splits into two parts: one containing gelatinous material ("gelled polymer chains") and supernatant solvent that contains soluble polymeric composition having "non-gelled polymeric chains"—in other words, the original solid polymeric composition contained both soluble ("non-gelled") and insoluble ("gelled") polymer chains. These two parts or components can be separated by either decanting, filtering or centrifuging the system. Further characterization of each phase (part) can then be carried out. Thermal analysis, etc. can be carried out in either part of the system by evaporating off the solvent. However, certain tests can be applied exclusively to the soluble phase (i.e., the supernatant solvent containing polymeric composition having non-gelled polymer chains) because only this portion the characteristics required to obtain trust-worthy test results. For example, molecular weight characterization by means of gel permeation chromatography (GPC) can be performed on the soluble phase only, because gelled material does not render reliable results from this test. For that reason, and to avoid the presence of gelled material and impurities in general, when GPC is performed, solutions are pre-filtered to obtain a free-flowing solution containing only polymeric composition having non-gelled polymer chains.

After being tested for the presence of gelled polymer chains, the three-stage polymer particles comprising the polymeric composition of the present invention as the core stage, were blended at 5% in polypropylene and tested for its Jratio according generally to the methods described in Example 3. Results indicated in the table below show that excessive gelled polymer in the polymeric composition results, apparently causing a reduction in the Jratio.

| Ex. | Chain Branching Monomer, % | Jratio | Results of Test for Presence of Gel | Peak Average MW, g/mol | Weight Average MW, g/mol |
|---|---|---|---|---|---|
| 5a | 0.028 | 1.99 | no gel apparent | 746,000 | 1,100,000 |
| 5b | 0.057 | 4.58 | no gel apparent | 844,000 | 1,270,000 |
| 5c | 0.114 | 1.13 | Gelled polymer chains present (5% in THF) | 360,000 (soluble portion only) | 747,000 (soluble portion only) |

Example 6

This example shows how using t-amyl hydroperoxide to reduce the amount of unpolymerized monomers results in high molecular weight lauryl methacrylate based compositions that retain their activity as melt strength additives better than comparable processes using t-butyl hydroperoxide.

A charge consisting of 30.3 parts of deionized water, 0.113 parts of Disponil (TM) FES 32 (aqueous, 30% solids, Henkel) and 0.741 parts of an aqueous solution of methyl beta cyclodextrin (50.9% solids, 1.8 degree of methyl substitution, Wacker) was added to an appropriate reactor, which was fitted with a condenser, a means for agitation, and means of temperature measurement. Nitrogen gas was added to sweep the surface of this aqueous mixture while the reactor contents were heated to 85° C.

While the mixture was heated up, four emulsified monomer mixes (EMM's) were prepared. The seed EMM consisted of 149 parts deionized water, 0.301 parts of Disponil FES 32, 1.64 parts of butyl methacrylate, 1.60 parts of methyl methacrylate, 0.363 parts of butyl acrylate, and 0.036 parts of methacrylic acid.

The first-stage EMM consisted of 49.6 parts deionized water, 0.594 parts of Disponil FES 32, 66.0 parts of lauryl methacrylate, 0.667 parts of methacrylic acid and 0.038 parts of allyl methacrylate.

The second-stage EMM consisted of 35.4 parts deionized water, 1.02 parts of Disponil FES 32, 4.71 parts of methyl methacrylate, 4.71 parts styrene, 0.238 parts of methacrylic acid and 0.005 parts of allyl methacrylate.

The third-stage EMM consisted of 24.2 parts deionized water, 1.04 parts of Disponil FES 32, 19.6 parts of methyl methacrylate, 0.20 parts of butyl acrylate, and 0.20 parts of methacrylic acid.

Mild agitation was used to emulsify three of the four EMM's listed above. The first-stage EMM was homogenized using a Ross mixer. This device was operated at 4,000 rpm until the entire EMM was fed through the mixer.

With the temperature stable at 85° C. and the N2 sweep on for at least 45 minutes, 0.385 parts of sodium carbonate dissolved in 1.43 parts deionized water was added to the reactor, decreasing the temperature to 82° C.

Then the seed EMM described above was added followed by 0.385 parts of sodium persulfate dissolved in 1.42 parts deionized water. Within a few minutes, a 3 degree exotherm was detected. Ten minutes after adding the initiator, a mixture consisting of 0.126 parts of sodium persulfate and 8.45 parts deionized water was added over a 145 minute period. Simultaneously with the start of the cofeed catalyst mixture, the first-stage EMM was gradually added over 90 minutes. Temperature was maintained at 85° C. during this feed. The first-stage EMM was rinsed in with 3.42 parts deionized water. The second-stage EMM was then added over 25 minutes. At this point, the second-stage EMM was flushed with 23.6 parts deionized water. Temperature was still maintained at 85° C. Then, the third-stage EMM was added over 30 minutes, during which a slight exotherm took place. The reaction mixture was cooled back to 85° C. and the third-stage EMM feed continued until it was completed, at which point it was flushed with 11.4 parts of deionized water. The cofeed catalyst feed ended at the same time the third-stage EMM feed was completed. It was rinsed into the reactor with 0.571 parts deionized water. The reaction mixture was cooled to 60° C.

Residual monomer was reduced by the addition of 0.021 parts ferric monosodium ethylenediaminetetraacetate dihydrate, 0.057 parts of 85% aqueous tert-amyl hydroperoxide, 0.071 parts of sodium formaldehyde-sulfoxylate and a total of 2.00 parts deionized water. The mixture was allowed to react for 20 minutes, at which point the Nitrogen sweep was turned off, the mixture was cooled to 40° C., and the agitation was shut off, and the batch removed and sampled.

The results provided in the table below compares the residual monomer level remaining in the polymer particle dispersions of Example 6 to similarly prepared dispersions having different process steps for reducing the residual monomers:

| | Method to Reduce | Residual Monomers (ppm, unless otherwise indicated) | | | |
|---|---|---|---|---|---|
| Ex. | Residual Monomer | LMA | MMA | BA | Sty |
| R2 | none | 0.03% | 1500 | 81 | 27 |
| 6a | t-AHP/SFS | <0.01% | 56 | <1 | 1 |
| 6b | t-AHP/IAA | <0.01% | 140 | 5 | 1 |
| 6c | t-BHP/IAA + antioxidant | <0.01% | 120 | 1 | 1 |
| 6d | t-BHP/IAA | <0.01% | 94 | 1 | 1 |

Test samples were aged in the aqueous polymer particle dispersion form and an appropriate amount was freeze-coagulated and dried prior to testing. The results provided in the table below compare the Jratio of polypropylene blends prepared with the polymeric materials that are aged over time:

| | Method to Reduce | Jratio (milled at 5 wt. % into PP 6310) Aging Results (days since preparation of polymeric additive) | | | | | |
|---|---|---|---|---|---|---|---|
| Ex. | Residual Monomer | 0 | 9 | 16 | 44 | 61 | 112 |
| R2 | none | 4.17 | 4.87 | 3.93 | 4.04 | 4.07 | 4.20 |
| 6a | t-AHP/SFS | 4.79 | 4.09 | 4.14 | 4.36 | 4.56 | 4.45 |
| 6b | t-AHP/IAA | 4.98 | 4.41 | 4.56 | 4.22 | 4.36 | 4.71 |
| 6c | t-BHP/IAA + antioxidant | 4.87 | 4.92 | 5.20 | 3.81 | 3.50 | 3.75 |
| 6d | t-BHP/IAA | 4.69 | 4.46 | 4.43 | 1.71 | 2.12 | 1.89 |

While each of the methods are effective at reducing the residual monomer levels, the methods which used t-AHP had the added benefit of maintaining performance (high Jratio) over time, whereas the t-BHP method in Ex. 6d resulted in a dramatically lower performance at 44 days and thereafter. Use of an antioxidant with t-BHP in Ex. 6c helps to maintain the decrease in Jratio performance, but not as well as the t-AHP methods in Examples 6a and 6b.

What is claimed is:

1. A process for preparing an aqueous dispersion of polymer particles comprising a polymeric composition having non-gelled polymer chains, said process comprising the steps of:
   a) preparing an aqueous emulsion of hydrophobic monomer droplets, said droplets comprising:
      i) at least one $C_8$ to $C_{30}$ alkyl (meth)acrylate monomer,
      ii) at least one chain branching monomer, said chain branching monomer present in an amount not greater than 0.10 weight percent based on total weight of the $C_8$ to $C_{30}$ alkyl (meth)acrylate monomer,
      iii) at least one monomer transport aid, and
      (iv) at least one emulsifier; and
   b) polymerizing, by at least one technique selected from the group consisting of conventional emulsion polymerization bulk polymerization and solution polymerization, said $C_8$ to $C_{30}$ alkyl (meth)acrylate monomer with said at least one chain branching monomer using at least one free radical initiator to form said aqueous dispersion of polymer particles comprising a polymeric composition having non-gelled polymer chains, wherein said polymeric composition has a weight average molecular weight of at least 100,000 g/mol.

2. The process according to claim 1, further comprising the step of reducing the amount of unpolymerized monomers using at least one of the following: t-alkyl hydroperoxide, t-alkyl peroxide, and t-alkyl perester, wherein the t-alkyl group includes at least 5 carbon atoms; and optionally at least one other oxidant.

3. The process according to claim 1, wherein said aqueous emulsion of hydrophobic monomer droplets is prepared using high shear means to provide a mean droplet diameter of less than 30 microns.

4. The process according to claim 1, wherein said at least one monomer transport aid comprises cyclodextrin.

5. The process according to claim 1, wherein said polymerizing step is performed to produce said polymer particles which comprise at least one soft phase, which comprises said polymeric composition having non-gelled polymer chains, and at least one hard phase, said at least one hard phase having a glass transition temperature of at least 25° C.

6. The process according to claim 5, wherein said at least one hard phase is selected from the group consisting of at least one hard polymer shell disposed externally to each of said polymer particles, a plurality of hard polymer particles, and combinations thereof.

7. The process according to claim 6, wherein said polymerizing step comprises forming by polymerization a plurality of soft polymer particles, comprising said polymeric composition having non-gelled polymer chains, as said at least one soft phase in said aqueous dispersion of polymer particles, and adding to said aqueous dispersion of polymer particles a plurality of hard polymer particles as said at least one hard phase.

8. The process according to claim 6, wherein said polymerizing step further comprises at least one technique selected from the group consisting of polymerization, multistaged polymerization and agglomeration, to form said polymer particles wherein each of said polymer particles comprises at least one core as said soft phase and at least one shell as said at least one hard phase.

9. The process according to claim 8, wherein said polymerizing step comprises multi staged polymerization wherein said $C_8$ to $C_{30}$ alkyl (meth)acrylate monomer are polymerized with said at least one chain branching monomer to form said at least one core of each of said polymer particles and at least one ethylenically unsaturated monomer is polymerized in the presence of said at least one core to form said at least one shell externally on each of said polymer particles.

10. The process according to claim 9, wherein said polymerizing step comprises polymerizing said $C_8$ to $C_{30}$ alkyl (meth)acrylate monomer with said at least one chain branching monomer to form said at least one core of each of said polymer particles, and polymerizing at least one ethylenically unsaturated monomer in the presence of said at least one core to form an inner polymer shell adjacent to each of said at least one core, forming a plurality of core-and-inner-shell-particles, and polymerizing at least one ethylenically unsaturated monomer in the presence of said plurality of core-and-inner-shell particles to form an outer polymer shell situated externally to said inner polymer shell of each of said particles, whereby said at least one shell comprises said inner polymer shell and said outer polymer shell, wherein said inner polymer shell is situated adjacent to said at least one core of each of said polymer particles, and said outer polymer shell is situated external to said inner polymer shell.

11. The process according to any one of claims 1, 2–4 and 5–10, further comprising at least one step to remove water from said aqueous dispersion of polymer particles, so that said polymer particles are in the form of at least one of the following: a wetcake, powder, tablet, pellet, bead, film, and extrudate.

* * * * *